United States Patent [19]
Matz

[11] 3,979,661
[45] Sept. 7, 1976

[54] POWER SUPPLY APPARATUS HAVING AN OUTPUT VOLTAGE WITHIN A LIMITED RANGE REGARDLESS OF INPUT VOLTAGE VARIATIONS AND HAVING MINIMAL POWER DISSIPATION

[75] Inventor: Bjorn J. Matz, Forest Hills, N.Y.

[73] Assignee: Dictaphone Corporation, Rye, N.Y.

[22] Filed: Dec. 30, 1974

[21] Appl. No.: 537,455

[52] U.S. Cl. .......................... 321/18; 307/252 UA; 321/20; 323/23; 323/45
[51] Int. Cl.² ..................... H02P 13/24; G05F 5/00
[58] Field of Search ......................... 321/16, 18, 20; 323/22 SC, 43.5 S, 45, 50, 23, 25; 307/252 N, 252 T, 252 UA

[56] References Cited
UNITED STATES PATENTS

| | | | |
|---|---|---|---|
| 2,763,831 | 9/1956 | Ulga | 323/45 |
| 3,195,036 | 7/1965 | McNulty et al. | 323/43.5 S |
| 3,365,654 | 1/1968 | Johnston | 323/22 SC |
| 3,408,558 | 10/1968 | Peterson et al. | 323/22 SC |
| 3,470,444 | 9/1969 | Bixby | 323/22 SC |
| 3,571,698 | 3/1971 | McCabe | 321/20 |

*Primary Examiner*—Gerald Goldberg
*Attorney, Agent, or Firm*—Curtis, Morris & Safford

[57] ABSTRACT

A power supply apparatus having minimal power dissipation for supplying a substantially constant voltage regardless of the variation of an input voltage. A transformer having primary and secondary windings is provided to receive an input voltage and to produce an output voltage from which the substantially constant voltage is derived. The turns ratio of the transformer is varied in response to variations in the amplitude of the input voltage which exceed a predetermined range such that the turns ratio is reduced when the input voltage is increased and the turns ratio is increased when the input voltage is reduced. In one embodiment of this invention, when the supplied substantially constant voltage exhibits variations of greater than predetermined magnitude, an audio signal processing circuit which is powered by the substantially constant voltage is substantially disabled.

8 Claims, 4 Drawing Figures

POWER SUPPLY APPARATUS HAVING AN OUTPUT VOLTAGE WITHIN A LIMITED RANGE REGARDLESS OF INPUT VOLTAGE VARIATIONS AND HAVING MINIMAL POWER DISSIPATION

BACKGROUND OF THE INVENTION

This invention relates to power supply apparatus and, more particularly, to apparatus having minimal power dissapation for supplying an output voltage of substantially constant range regardless of the range of variation of an input voltage.

In general, power supplies are known wherein an input AC line voltage is used to derive an output voltage of constant magnitude. Typically, the output voltage is a regulated DC voltage having minimal ripple factor and exhibiting a substantially constant magnitude held within a constrained range of variations.

Heretofore, such power supplies have been designed to account, or compensate, for very large variations in the amplitude of the AC input line voltage. However, it has been found that, to account for this large range of voltage variation, an undesirable amount of power dissipation must be provided. For example, if the input AC line voltage increases so as to greatly exceed an optimum value, the regulated output voltage produced by the power supply must not similarly increase. Nevertheless, the excess input voltage must somehow be dissipated. Usually, this is provided with conventional power dissipating elements, with the result that excessive heat often is produced and, moreover, an unnecessary amount of power is supplied to the power supply. This, of course, requires that the various circuit elements exhibit suitably high operating power levels; and, moreover, the higher the cost of operating the powered apparatus at such higher power levels is not preferable.

These prior power supplies are further complicated by the fact that they must be designed with the anticipation that the input voltage levels also are susceptible to significant reduction. Hence, suitable amplification must be provided to ensure that the regulated voltage produced by these power supplies is, nevertheless, maintained during such power reductions.

Therefore, it is apparent that there has been a long felt need for a power supply which can satisfactorily operate throughout a wide range of input voltage levels while enabling a substantially constant regulated voltage to be derived therefrom. Moreover, there has been a clear need for such power supplies wherein only a minimum amount of unnecessary power is dissipated.

It is apparent that such power supplies having minimum power dissipation can be used to energize various appliances, signal processing apparatus, and virtually any other electrical device. Moreover, such power supplies which are capable of providing the same output voltage regardless of the amplitude and range of variations in the amplitude of an input voltage can advantageously be used even in those locations wherein the precise line voltage is not known. As an example, a user of a device wherein such a power supply is incorporated can readily power that device directly from the input AC voltage in both the United States wherein the line voltage is approximately 110 volts and in Europe where the line voltage is approximately 220 volts. A desirable feature of this power supply is that no manual switching or other operation is necessary to account or compensate for such differences in the input AC line voltage.

OBJECTS OF THE INVENTION

Therefore, it is an object of the present invention to provide an improved power supply having minimal power dissipation.

It is another object of this invention to provide an improved power supply which is supplied with an AC line voltage and wherein changes in the AC line voltage are accounted for without substantially increasing the power dissipation.

A still further object of this invention is to provide an improved power supply wherein a transformer receives an AC line voltage and produces an output voltage from which a regulated voltage is derived, and wherein the turns ratio of the transformer is varied in accordance with variations in the amplitude of the imput voltage.

Another object of this invention is to provide an improved power supply having an imput transformer comprised of a primary winding and a secondary winding, the secondary winding being formed of a first set and additional sets of windings and wherein the additional sets of windings are selectively connected to the first set of windings to thereby change the secondary voltage as the primary voltage is varied.

A still further object of this invention is to provide an improved power supply wherein the turns ratio of the input transformer included therein is varied to compensate for changes in the input line voltage such that the output, unregulated voltage produced by the input transformer is maintained within a narrow range.

Still another object of this invention is to provide an improved power supply for an audio signal processing apparatus and wherein the audio signal processed by such processing apparatus is substantially attenuated in response to significant variations in regulated voltage produced by the power supply.

Various other objects and advantages of the invention will become apparent from the forthcomming detailed description, and the novel features will be a particularly pointed out in the appended claims.

SUMMARY OF THE INVENTION

In accordance with the present invention, a power supply is provided for supplying, with minimal power dissipation, a substantially constant output voltage regardless of the variations of the input voltage, the power supply including an input transformer for receiving the input voltage and for producing an output voltage from which the substantially constant voltage is derived; and a device for varying the turns ratio of the input transformer in response to variations in the amplitude of the input voltage, which variations exceed a predetermined amount, such that the turns ratio is reduced when the input voltage is increased and the turns ratio is increased when the input voltage is reduced.

In one embodiment of the present invention, the voltage produced by the power supply is used to derive a regulated voltage for energizing audio signal processing apparatus, and wherein such signal processing apparatus includes a voltage variation detector for detecting variations in the regulated voltage of greater than predetermined magnitude; and a switch responsive to the voltage variation detector for connecting a signal attenuator to the audio signal processing apparatus to thereby substantially attenuate the audio signal processed thereby.

BRIEF DESCRIPTION OF THE DRAWINGS

The following detailed description will best be understood in conjunction with the accompanying drawings in which.

DETAILED DESCRIPTION OF CERTAIN ONES OF THE PREFERRED EMBODIMENTS

Power Supply

Figure 1:
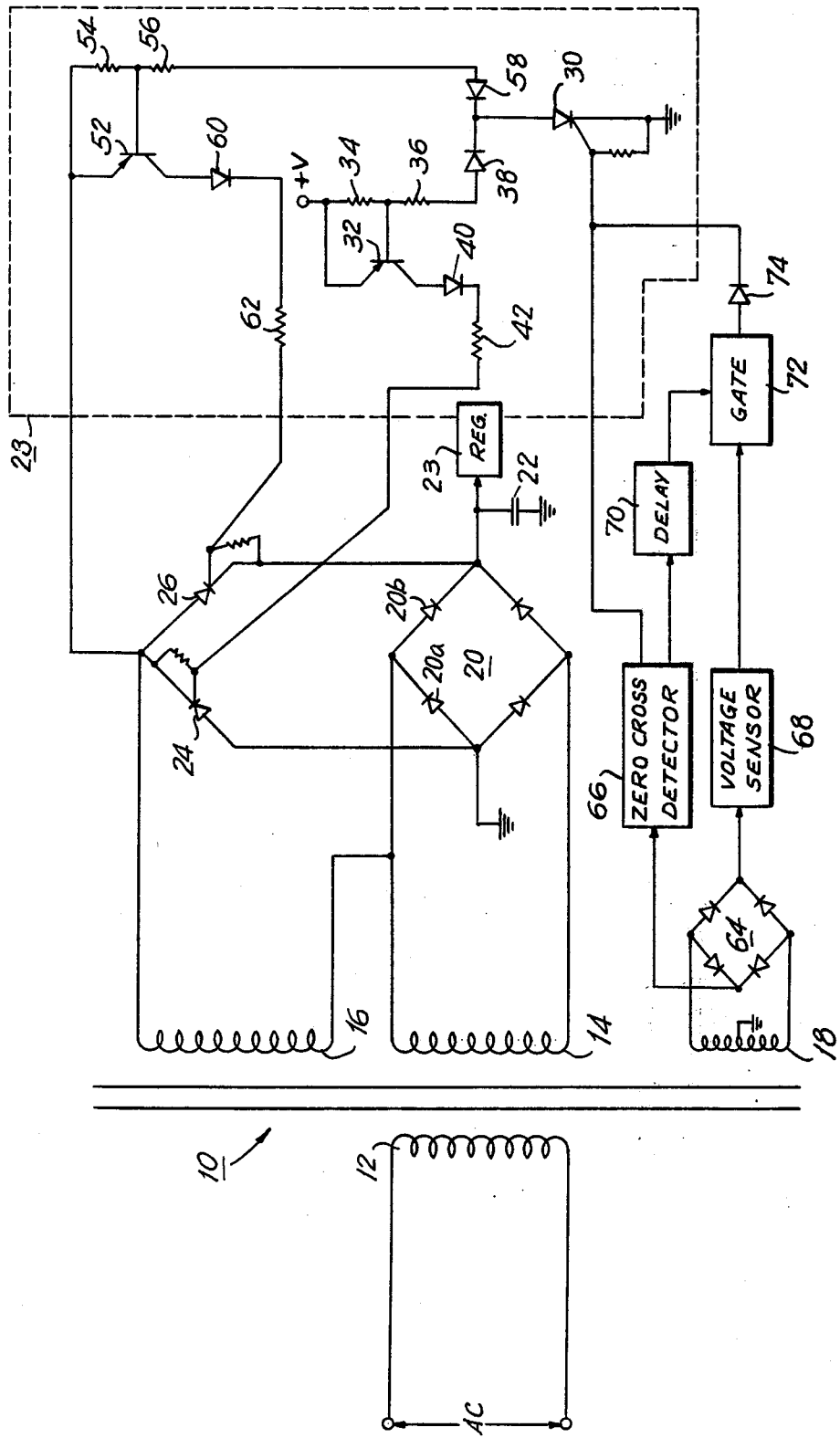
FIG. 1 is a partial schematic, partial block diagram of a power supply in accordance with the present invention.

Referring now to the drawings and, in particular, to FIG. 1, there is illustrated a partial block, partial schematic diagram of power supply apparatus in accordance with the present invention. The depicted power supply apparatus is adapted to supply an output voltage in response to an input AC line voltage, the output voltage being initially unregulated and subjected to a subsequent regulating operation. Moreover, the power supply apparatus is capable of responding to a wide range of input line voltages while maintaining a substantially narrow range of output voltage and with a minimum of power dissipation. As a numerical example, an output voltage of approximately 25 volts is produced even if the input line voltage varies from, for example, 90 volts to, for example, 140 volts. Moreover, the teachings of the present invention can be turned to account to further accomodate even higher input line voltages, for example, of 200 volts and more.

The illustrated power supply apparatus is comprised of an input transformer 10 having a primary winding 12 and secondary windings. The secondary windings are comprised of a plurality of sets of windings, only two sets 14 and 16 being shown. The underlying principle of operation of the present invention is to vary the turns ratio between the primary and secondary windings as a function of the input AC line voltage. For example, if the input line voltage falls below a predetermined threshold level, the turns ratio is increased so as to increase the ratio of transformation, thereby maintaining approximately the same output voltage even though the input voltage has been reduced. Conversely, if the input line voltage exceeds a threshold level, the turns ratio is reduced such that the output voltage is approximately the same as the before even though the input voltage has increased. The manner in which the turns ratio is varied is by selectively connecting the sets of secondary windings in series or to disconnect this series connection of sets of secondary windings in accordance with the amplitude variations of the input AC line voltage. This selective series connection is performed automatically by the illustrated apparatus. Thus, as will become apparent, the effective number of turns of the secondary winding is increased when the input AC line voltage is reduced and, conversely, the effective number of turns of the secondary winding is reduced when the input AC line voltage is increased.

The primary winding 12 is adapted to be supplied with an imput AC line voltage of, for example, 60 Hz. It should be recognized that the particular frequency of the AC line voltage does not affect the performance of the illustrated power supply apparatus. Accordingly, the illustrated apparatus will perform satisfactorily with an input AC line voltage of, for example, 50 Hz.

The first, or main, set of secondary windings 14 is connected to a conventional rectifier bridge 20 to derive at the output of the rectifier bridge an unregulated full-wave rectified DC voltage. This unregulated voltage is smoothed so as to minimize the ripple factor by a smoothing capacitor 22 and is supplied to a voltage regulator circuit 23. The particular structure of the voltage regulator circuit forms no part of the present invention. However, it should be recognized that this regulator circuit is adapted to respond to a range of unregulated input DC voltage to produce an output DC voltage which is accurately regulated to a predetermined DC amplitude. This regulated output DC voltage may then be used as an operating, or energizing, potential to power further apparatus. One embodiment of further apparatus which may be powered by such regulated DC voltage is described hereinbelow with respect to FIG. 4.

The illustrated second set of secondary windings 16 is adapted to be connected in series with the first set 14 by switchable rectifiers 24 and 26. These switchable rectifiers are controlled rectifiers, such as silicon controlled rectifiers (SCR). As shown, the SCR's 24 and 26 are connected in parallel with the upper rectifiers 20a and 20b included in the rectifier bridge 20, as viewed in FIG. 1. It will be recognized that, when the SCR's 24 and 26 are actuated, or switched on, current flows therethrough from the second set of secondary windings 16 so that the upper rectifiers included in the bridge 20 are reverse biased. When these upper rectifiers are reversed biased, current does not flow therethrough and the windings 14 and 16 are electrically connected in series.

In accordance with this invention, the SCR's 24 and 26 are actuated when the input AC line voltage falls below a threshold level. Moreover, to avoid RFI the SCR's 24 and 26 are actuated during predetermined intervals of the periodic cycle of the input AC voltage. In particular, the SCR's 24 and 26 are switched on at the zero crossing points of the input line voltage.

This control of the SCR's 24 and 26 is achieved by a voltage sensor 68 which is adapted to sense the input line voltage amplitude, a zero crossing detector 66 which is adapted to detect the zero crossing points of the input line voltage, a gating circuit 72 which is adapted to supply an acutating voltage for switching on the SCR's 24 and 26 at the zero crossing points, and an energizing circuit 28 which is responsive to the actuating voltage for energizing the SCR's. The voltage sensing circuit 68 includes an input coupled to a rectifier bridge 64, the rectifier bridge being supplied with an AC voltage derived from tertiary winding 18. The tertiary winding may be included in the transformer 10 such that the rectified DC voltage produced by the rectifier bridge 64 exhibits an amplitude which is a direct function of the amplitude of the input AC line voltage supplied to the primary winding 12. The voltage sensing circuit may comprise a schmidt trigger, a threshold detector or the like so as to produce a first output voltage when the input voltage supplied thereto exceeds a threshold level, and to produce a second output voltage when the input voltage applied thereto is less than a threshold level. for purposes of the present discussion, it will be assumed that, when the rectified DC voltage applied to the voltage sensing circuit 68 is less than a threshold level, an output voltage of relatively lower level is produced by the voltage sensing circuit. Conversely, a relatively higher level output voltage is produced by this voltage sensing circuit in response to an input rectified DC voltage which exceeds the threshold level.

The zero crossing detector 66 is connected to the tertiary winding 18 and may comprise a conventional zero level detecting circuit adapted to produce output pulses synchronized with the zero crossings of the AC voltage derived across the tertiary winding. One embodiment of a zero crossing detector which has been designed for use with the present invention is described hereinbelow with respect to FIG. 3. The output of the zero crossing detector is supplied through a delay circuit 70 to a gating circuit 72. The delay circuit 70 may comprise any suitable signal delay device and one embodiment thereof is described below as comprising an RC circuit having a slow charging time constant and a relatively faster discharge time constant. The delay circuit 20 is thus adapted to effectively stretch the pulse durations of the pulses produced by the zero crossing detector 66 and, therefore, may comprise a one-shot circuit, if desired. The pulses supplied to the gating circuit 72 by the delay circuit act as enabling pulses which actuate the gating circuit to invert and transmit an actuating voltage which might be applied thereto by the voltage sensing circuit 68. The gating circuit may comprise an analog gate, a NOR gate, or the like. One embodiment of a gating circuit which may be used with the present invention is described hereinbelow with respect to FIG. 3.

Another output of the zero crossing detector 66 is additionally supplied to the energizing circuit 28, as is the output of the gating circuit 72. As shown, the gating circuit is connected to the energizing circuit 28 by a diode 74. The purpose of this diode will soon become apparent. Suffice it to say that the diode serves to electrically isolate the gating circuit 72 from the energizing circuit such that spurious signals are not erroneously supplied to the energizing circuit. The energizing circuit 28 is comprised of a storage element which is adapted to store a representation of an actuating signal supplied by the gating circuit 72. The energizing circuit further includes respective driving circuits for the SCR's 24 and 26. These driving circuits respond to the stored representation of an actuating voltage to thereby energize the respective SCR's.

In the illustrated embodiment, the storage element is comprised of a controlled switch, such as an SCR 30 having its gate electrode connected to receive quenching pulses produced by the zero crossing detector 66 and, additionally, to receive the actuating voltage transmitted by the gating circuit 72. As is recognized, once actuated, the switch will remain in its conductive state until the sustaining voltages or currents supplied to the switch fall below a sustaining threshold level or until a quenching signal is applied to the control electrode. The anode-cathode circuit of the SCR 30 is connected to a first path comprised of a source of regulated voltage +V, series connected resistors 34 and 36 and a diode 38. The SCR 30 additionally is connected in a second path comprised of the junction defined by the SCR's 24 and 26, series connected resistors 54 and 56 and a diode 58. As shown, the cathodes of the diodes 38 and 58 are connected to a common junction which, in turn, is connected to the anode-cathode circuit of the SCR 30. As is appreciated, when current flows through the SCR 30, it flows through at least one of these first and second paths.

The first current conducting path serves as a bias circuit for a transistor 32. In particular, the base electrode of the transistor 32 is connected to the junction defined by the series-connected resistors 34 and 36. In one embodiment thereof, the transistor 32 comprises a pnp transistor having its collector electrode connected through a diode 40 and a resistor 42 to the gate electrode of the SCR 24. As is appreciated, when current flows through the first current conducting path, the transistor 32 is rendered conductive so as to supply a suitable actuating voltage to the gate electrode of the SCR 24, thereby switching on this SCR.

In a similar manner, the second current conducting path serves as a bias circuit for a transistor 52. The transistor 52 is similar to the aforedescribed transistor 32 and includes a collector electrode connected through a diode 60 and a resistor 62 to the gate electrode of the SCR 26. Accordingly, when current flows through the second current conducting path, the transistor 52 is rendered conductive to thereby supply an actuating voltage to the gate electrode of the SCR 26, whereby this SCR is switched on.

The operation of the illustrated power supply apparatus now will be described in conjunction with the waveform diagrams depicted in FIG. 2. Let it initially be assumed that the input AC line voltage is less than a predetermined threshold level. It is appreciate that, in accordance with this assumption, it is desired to increase the turns ratio between the primary and secondary windings of the input transformer 10. Prior to increasing this turns ratio, the induced AC voltage provided across the first set of secondary windings 14 is rectified by the bridge 20, smoothed by the capacitor 22 and supplied to the regulator circuit 23. A return path for the rectified DC voltage extends through the terminal of the bridge 20 designated at ground level and to the lower end of the winding 14. Of course, during the next half portion of the AC voltage cycle, the return path extends to the upper end of the winding 14.

An additional full-wave rectified AC representation of the input AC line voltage is supplied to the voltage sensing circuit 68 by the bridge rectifier 64. Since it has been assumed that the input AC line voltage is less than the threshold level, it is appreciated that the rectified DC voltage applied to the voltage sensing circuit 68 likewise is less than a threshold level. Accordingly, the voltage sensing circuit 68 supplies a relatively lower level DC voltage to be inverted by the gating circuit 72. However, this gating circuit is disabled except for those intervals determined by the zero crossing detector 66 and the delay circuit 70.

Figure 2:
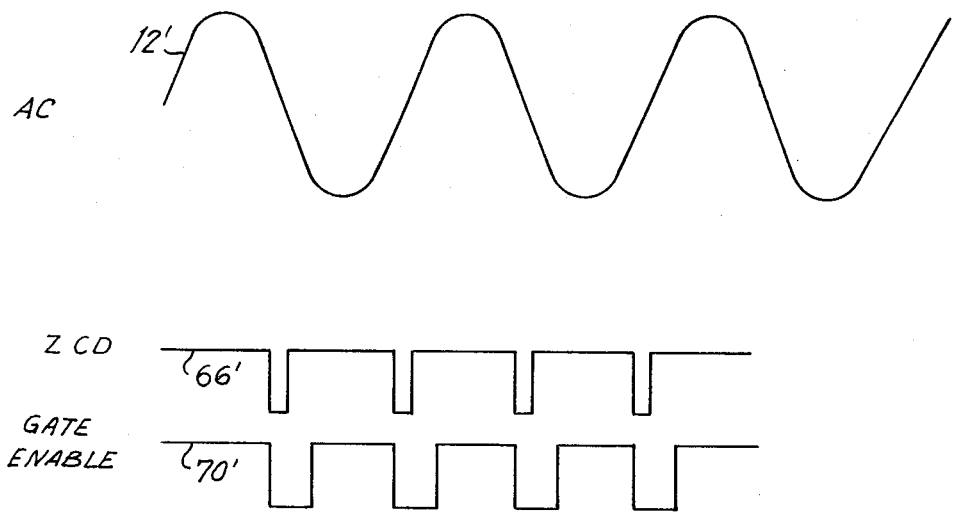
FIG. 2 is a waveform diagram of various signals which are produced by particular components of the power supply.

When the zero crossing detector 66 senses the zero crossing points of the input AC waveform 12', shown in FIG. 2, a negative-going pulse 66' is produced by the detecting circuit. This negative-going pulse is applied to the gate electrode of the SCR 30 to thereby quench the SCR in preparation for responding to a subsequent actuating voltage. Accordingly, the SCR 30 is disposed in a ready, or quiescent state prior to receiving an actuating voltage indicative of the relative amplitude of the input AC line voltage.

The delay circuit 70 responds to the negative transition in the pulse 66' so as to produce a positive transition at its output. In the embodiment to be described, the delay circuit 70 is charged to a positive level in response to this negative transistion in pulse 66'. Thus, a negative gate enabling pulse 70', for example, is supplied to the gating circuit 72 by the delay circuit 70. This enabling pulse 70' has a predetermined duration and, as will be described below, the delay circuit charges at a relatively slower rate once the pulse 66' has terminated.

It is recognized that, for the duration of the negative-going pulse 66', the diode 74 is biased so that the actuating signal transmitted by the gating circuit 72 in response to the enabling pulse 70' is not supplied to the gate electrode of the SCR 30 during this interval. However, once the pulse 66' terminates, the diode 74 no longer is so biased and the actuating signal produced by the voltage sensing circuit 68 now is transmitted through the gating circuit to the gate electrode of the SCR 30. Accordingly, it will be appreciated that, if desired, the delay circuit 70 may comprise a one-shot circuit which is responsive to the positive transition in the pulse 66'. In that embodiment, the pulses 66' first will quench the SCR 30 and then the gating circuit 72 will be enabled by the one-shot circuit output pulses to transmit the actuating voltage to the SCR.

When the SCR 30 is rendered conductive, current flows therethrough from the first and second current conducting paths. Accordingly, current flowing through the resistors 54 and 56 is effective to turn on the transistor 52. Similarly, current flowing through the resistors 34 and 36 is effective to turn on the transistor 32. It is recognized that, when the respective transistors 32 and 52 are turned on, suitable energizing voltages are applied to the gate electrodes of the SCR's 24 and 26 to thereby render these SCR's conductive. Now, during the positive half cycle of the input AC line voltage, the SCR 24 is reverse biased and the SCR 26 is forward biased. Moreover, since the voltage at the upper portion of the winding 16 is greater than the voltage at the upper portion of the winding 14, it is appreciated that current flowing through the SCR 26 is effective to reverse bias the diode 20a included in the rectifier bridge 20. Therefore, during this positive half cycle of the input AC line voltage, the windings 14 and 16 are effectively connected in series. As a result thereof, the turns ratio between the primary and secondary windings is increased as a function of the turns included in the second set 16 of secondary windings. Consequently, even though the input AC line voltage has been reduced, the smoothed unregulated DC voltage applied to the regulating circuit 23 remains at approximately the same level as before. This is because the ratio of transformation of the transformer 10 has been increased to compensate for the decrease in the input line voltage.

Now, during the second half cycle of the input AC line voltage, it is recognized that the voltage applied to the anode of the SCR 26 no longer is sufficient to sustain conduction. Also, during this second half cycle, current no longer flows through the resistors 54 and 56, thereby rendering the transistor 52 nonconductive. Consequently, the SCR 26 is switched off. Now, when the next zero crossing point is detected by the zero crossing detector 66, the SCR 30 first is quenched and, since the input AC line voltage has been assumed to be less than the predetermined threshold level, immediately following the quenching of the SCR 30, the gating circuit 72 transmits an acutuating voltage thereto. Accordingly, the SCR 30 again is rendered conductive and current now is permitted to flow from the source of operating potential +V through resistors 34 and 36, through the diode 38 and through the SCR 30 to ground. Thus, during this second, or negative, half cycle of the input line voltage, the transistor 32 is rendered conductive to thereby supply an energizing voltage to the gate electrode of the SCR 24. Accordingly, this SCR is switched on to provide a return current path to the upper end of the winding 16. It is recognized that, during this negative half cycle, the upper end of the winding 16 is relatively more negative than the upper end of the winding 14. Thus, the diode 20b included in the rectifier bridge 20 is here reverse biased. Thus, current does not flow through this portion of the rectifier bridge 20.

In view of the foregoing, it is readily apparent that, when the input AC line voltage falls below the predetermined threshold level established by the voltage sensing circuit 68, the first and second sets of windings 14 and 16 are effectively connected in series to thereby increase the ratio of transformation of the input transformer 10. It should be clearly recognized that, if desired, additional sets of windings similar to the set 16 may be provided, together with additional SCR's, similar to the SCR's 24 and 26. Also, further energizing circuits may be provided for these additional SCR's, these further energizing circuits being controlled by additional voltage sensing circuits and gating circuits. In this manner, the ratio of transformation may be further increased to account for changes in the input line voltage. It will be apparent that, as the number of additional sets of windings is increased, the resolution of the power supply apparatus is correspondingly increased. Hence, the unregulated DC voltage thus supplied to the regulating circuit 23 may be maintained within a very limited variation range even though the input line voltage is permitted to vary throughout a wide range. Also, by providing such further sets of secondary windings, the power dissipation of the power supply apparatus may be further minimized.

It may be recognized that, when the input AC line voltage increases above the threshold level, the series-connected sets of windings 14 and 16 are disconnected. This occurs because, as described above, when the input AC line voltage increases, the rectified DC voltage applied to the voltage sensing circuit 68 correspondingly increases. When the threshold level established by the voltage sensing circuit is exceeded, an actuating voltage no longer is supplied through the gating circuit 72. Therefore, during the zero crossing intervals, the SCR 30 will initially be quenched, as aforedescribed, but the gating circuit 72, when subsequently enabled, will not permit an actuating voltage to be transmitted to the SCR 30. Therefore, in the absence of such an actuating voltage, the SCR 30 remains in its quenced, or nonconducting state. Consequently, the transistors 32 and 52 are not rendered conductive and the SCR's 24 and 26 are not energized. Since the SCR's 24 and 26 are maintained in their switched off cconditions, the second set of windings 16 is not connected to the first set of windings 14. Hence, the ratio of transformation of the input transformer 10 is correspondingly reduced to compensate for the increase in the input AC line voltage. Of course, if further sets of secondary windings are provided, successive ones of these further sets will be sequentially disconnected as the input AC line voltage level rises.

A preferred embodiment of a zero crossing detector, delay circuit and gating circuit now will be described with reference to the schematic illustration thereof depicted in FIG. 3. As shown, the zero crossing detector 66 is comprised of a full-wave rectifier 108 adapted to provide a rectified representation of the AC voltage induced intertiary winding 18. The zero crossing detector additionally includes a transistor 110 connected to the full-wave rectifier 108 by a resistor 112 and including a bias resistor 114. The transistor 110 is particularly biased to its conducting state, such that only the lowest levels, i.e., the valleys, of the rectified voltage supplied thereto will render the transistor nonconductive. The collector electrode of the transistor 110 is connected to a source of operating potential +V by a load resistor 116 and, additionally, is connected to the base electrodes of the transistors 118 and 122 by resistors 120 and 124, respectively.

The transistor 118 is adapted to be rendered conductive when the transistor 110 is nonconductive and includes a collector electrode connected to the gate electrode of the aforedescribed SCR 30. The conductivity of the transistor 122 varies directly as the conductivity of the transistor 118. The collector electrode of the transistor 122 is connected to the source of operating potential +V by a resistor 126 and, additionally, is connected to the time delay circuit 70 by a resistor 128.

As is seen, the time delay circuit comprises an RC circuit formed of a capacitor 130 connected between the resistor 128 and ground, and a resistor 132 which is connected to the junction defined by the capacitor 130 and the resistor 128. The charging path of the capacitor 130 is seen to extend from the source of operation potential +V, through the resistors 126 and 128 and to the capacitor. The discharge path of this capacitor extends through the resistor 128 and to ground through the transistor 122. The voltage produced across the resistor 134 serves as an enabling voltage for the gating circuit 72.

The gating circuit 72 is depicted as a NOR circuit formed of transistors 102 and 104 having their respective collector-emitter junctions connected in parallel. The base electrode of the transistor 102 is adapted to be supplied with an actuating voltage produced by the voltage sensing circuit 68. The base electrode of the transistor 104 is adapted to receive the voltage produced across the resistor 134. The common-connected collector electrodes of the transistors 102 and 104 are connected to the source of operating potential +V by a collector load resistor 106. Additionally, these common-connected collectors are connected to the gate electrode of the SCR 30 by the diode 74. As will soon become apparent, the diode 74 serves to prevent a quenching voltage from being supplied to the SCR 30 by the common-connected collectors of the transistors 102 and 104.

Figure 3:
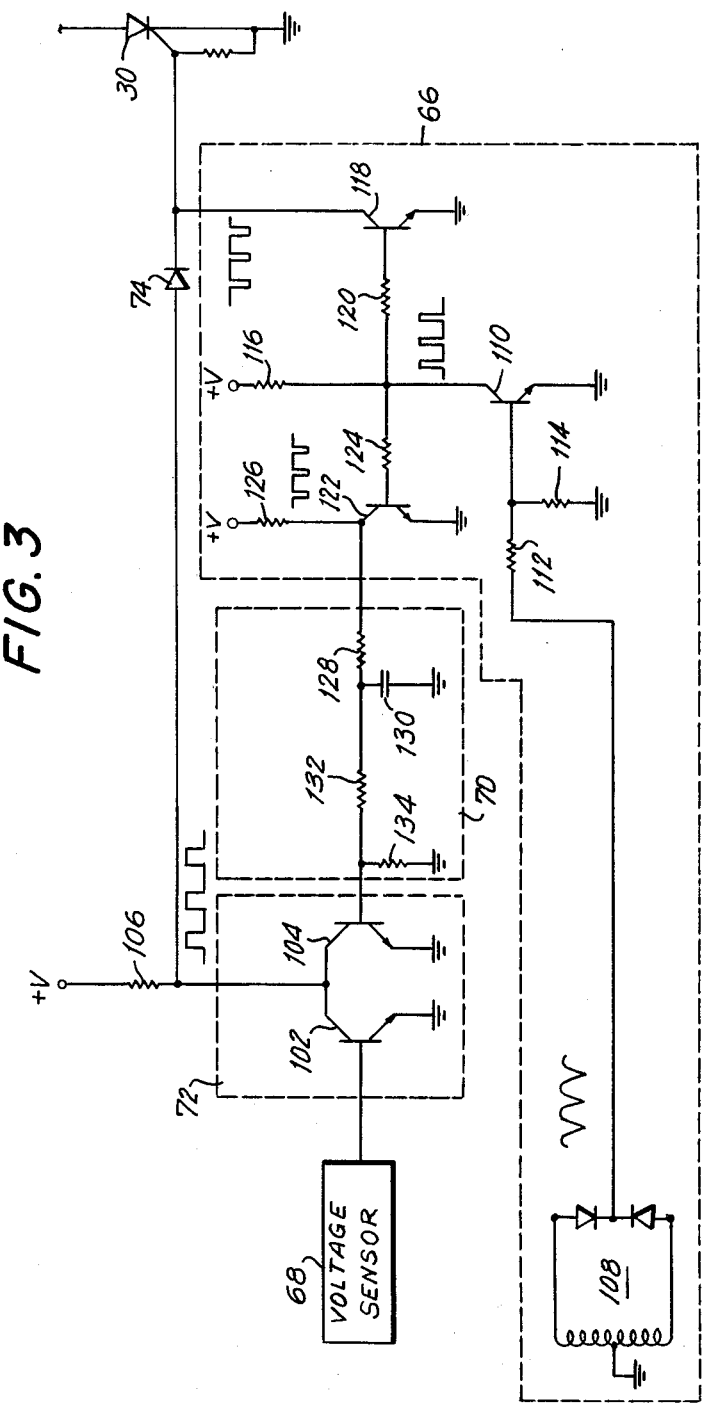
FIG. 3 is a schematic diagram showing the circuit components of various ones of the blocks depicted in FIG. 1.

The operation of the circuit schematically illustrated in FIG. 3 now will be briefly described. The rectified voltage supplied to the transistor 110 by the rectifier 108 is sufficient to maintain the transistor in its conducting state except during the valleys of the rectified voltage. It is appreciated that each valley of the rectified voltage corresponds to a zero crossing point of the input AC line voltage.

A pulse train is produced at the collector electrode of the transistor 110, as shown in response to the rectified voltage applied to the transistor, the pulses being coincident with the valleys of the rectified voltage. Each pulse included in the pulse train at the collector electrode of the transistor 110 is sufficient to render the respective transistors 118 and 122 conductive. Accordingly, a series of negative-going pulses are produced at the respective collector electrodes of these transistors, as shown, each negative pulse corresponding to the conducting state of the transistor.

It is appreciated that the negative pulses produced by the transistor 118 are supplied as quenching pulses to the gate electrode of the SCR 30. Accordingly, the connection between the transistor 118 and the SCR 30 corresponds to the connection between the zero crossing detector 66 and the SCR 30 illustrated in FIG. 1.

As previously noted, the RC delay circuit 70 has a relatively fast discharge rate and a relatively slow charging rate. It is appreciated that the capacitor 130 is charged through the resistors 126 and 128 when the transistor 122 is nonconducting. The interval between successive pulses produced at the collector electrode of the transistor 128 is sufficient to permit the capacitor 130 to be fully charged. Accordingly, when the transistor 122 is rendered conductive, i.e., turned on, the fully charged capacitor 130 discharges through the resistor 128 and the conducting transistor. When the voltage across the capacitor is discharged below the level necessary to maintain conduction of the transistor 104, that transistor is rendered non-conductive. Now, when the transistor 122 is again turned-off, the capacitor 130 slowly charges through the resistors 126 and 128. When the voltage across the capacitor 130 eventually is charged to the transistor turn-on level, the transistor 104 is rendered conductive. Accordingly, it is appreciated that the transistor 104 is rendered nonconductive for a predetermined duration or "window", at the zero crossing points of the input AC line voltage.

During the periods of nonconductivity of the transistor 104, the actuating voltage produced by the voltage sensing circuit 68 is permitted to be transmitted to the SCR 30. For example, if the input AC line voltage is less than the threshold level, the voltage sensing circuit 68 illustrated in FIG. 3 supplies a relatively low potential to the transistor 102 to thereby render that transistor non-conductive. Hence, during the periods of nonconductivity of the transistor 104, the common-connected collectors of these transistors is provided with a relatively higher voltage level, and this voltage level is transmitted through the diode 74 to the SCR 30. Consequently, the SCR 30 is actuated to its conducting state. However, if the input AC line voltage is greater than the threshold level, the voltage sensing circuit 68 supplies a relatively potential to the base electrode of the transistor 102 to thereby maintain that transistor in its conducting state. It is recognized that, if the transistor 102 is conducting, then the voltage at the common-connected collectors of the transistors 102 and 104 is maintained at a relatively lower voltage, regardless of the conductivity of the transistor 104. In that event, even when the transistor 104 is rendered nonconductive, the SCR 30 is not supplied with an actuating voltage.

From the foregoing, it is seen that the diode 74 serves to prevent a quenching voltage from being supplied to the SCR 30 at intervals other than the zero crossing points. That is, during those intervals when the transistor 104 is conducting such that the voltage provided at the collector electrode thereof is less than the voltage at the collector electrode of the transistor 118, the diode 74 is reverse biased. Hence, if the SCR 30 had been switched on, the diode 74 serves to block the voltage at the collector electrode of the transistor 104 from being applied to the gate electrode of the SCR 30, which voltage would tend to switch the SCR off. However, it should be further noted that, although the voltage at the collector electrode of the transistor 118 is sufficient to reverse bias the diode 74 during the nonzero crossing intervals, this voltage is not of a sufficiently high magnitude to serve as an actuating voltage for the SCR 30. Therefore, the SCR 30 is actuated only during the "window" interval immediately following the zero crossing point, and only if the voltage sensing circuit 68 senses that the input AC line voltage is less than the threshold level. At times other than the "window" intervals, the nonconductivity of the transistor 118 is not sufficient to actuate the SCR 30 if the SCR 30 if the SCR had not been previously switched on.

Audio Signal Processing Circuit.

Figure 4:
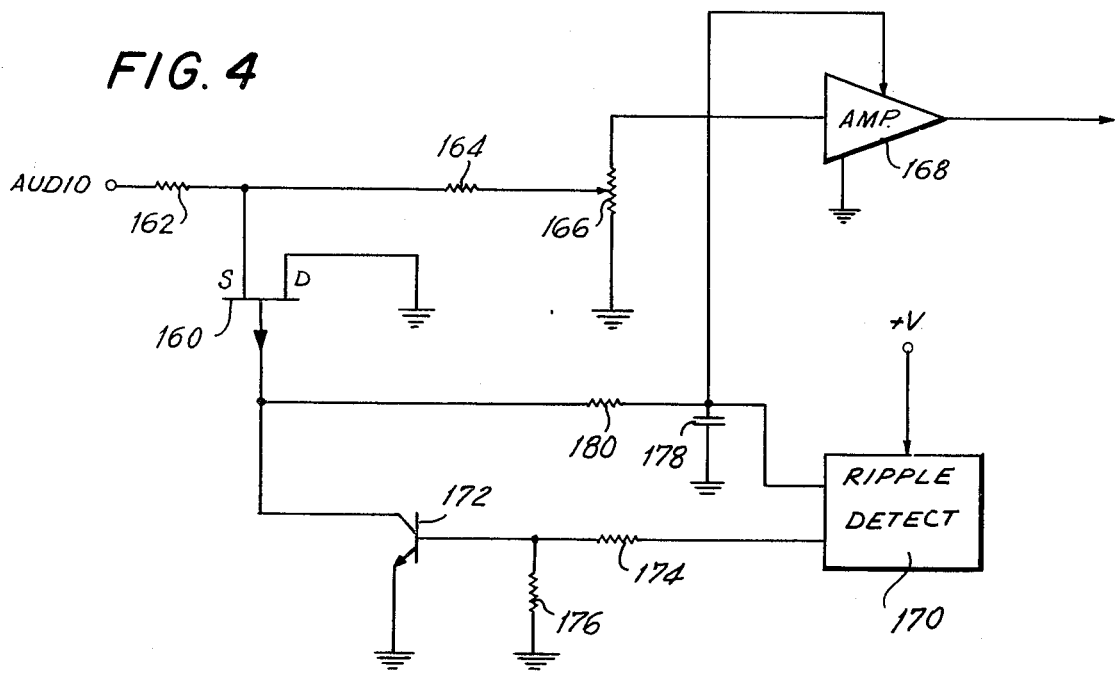
FIG. 4 is a schematic diagram representing a portion of the audio signal processing apparatus which is energized by the power of the present invention.

Referring now to FIG. 4, there is schematically illustrated an audio signal processing circuit which is operable upon audio signals, for example, and which is energized in response to the regulated DC output voltage produced by the regulating circuit 23 illustrated in the power supply apparatus of FIG. 1. As an example, the audio signal processing apparatus may comprise the audio electronics included in the playback circuit of a dictation system. This playback circuit may be provided to permit a dictator to listen to his previously dictated information or to permit a transcribing operator to transcribe recorded information. One example of such a dictation system wherein the illustrated audio signal processing apparatus finds ready application is described in detail in co-pending application Ser. No. 536,752 filed Dec. 27, 1974 assigned to Dictaphone Corporation, the assignee of the present invention.

The illustrated audio signal processing apparatus comprises a playback amplifier 168 which is adapted to be supplied with an audio signal through resistors 162 and 164 and a volume-control resistor 166. Typically, the audio signal may be produced by a playback head which reproduces audio information previously recorded on, for example, a magnetic tape. The output of the playback amplifier 168 may be coupled to a suitable sound transducer, such as headphones, or the like. The amplifier 168 is supplied with an operating voltage by a capacitor 178 derived from the regulating circuit 23, previously described with respect to FIG. 1. It has been found that, when power is initially supplied to the amplifier, as by turning on the power supply, it is possible that the voltage transients induced in the power supply and in the smplifier can result in the production of a loud or annoying sound in the sound transducer connected to the amplifier 168. Similarly, an annoying sound can be produced when power is terminated or if a significant ripple factor is introduced into the operating voltage. Therefore, it is another feature of the present invention to prevent such transient signals from being superposed onto the audio signal during the aforenoted power turn on, turn-off and ripple conditions.

To this effect, an attenuator circuit is selectively connected to the audio signal transmission path. This attenuator circuit is comprised of, for example, the source-drain circuit of a field effect transistor (FET) 160. As shown, the drain electrode of the FET 160 is connected to ground. Thus, when the FET 160 is actuated, a relatively low impedance path is connected in shunt relationship to the audio signal transmission path.

The FET 160 is adapted to be actuated, or turned on, when power is first turned on, when power is turned off or when an undesirably high ripple factor is detected in the regulated DC voltage supplied to the audio signal processing apparatus. Accordingly, a capacitor 178 is connected to a ripple detector 170 and is adapted to be charged when the voltage +V is initially supplied and, conversely, to be discharged when the voltage +V is abruptly terminated so as to detect turn on and turn off transitions. The capacitor 178 is connected to the gate electrode of the FET 160 by a resistor 180.

The operating voltage +V is supplied to the ripple detecting circuit 170. This ripple detecting circuit is adapted to detect the ripple voltage superposed on the regulated DC voltage derived from the regulating circuit 23 of FIG. 1. The ripple detecting circuit may comprise a peak detector adapted to produce an output voltage when the ripple factor exceeds a predetermined amount. As shown, the output of the ripple detector 170 is connected by a resistor 174 to a transistor 172. The base electrode of the transistor 172 is connected to ground through a resistor 176 and the collector electrode of this transistor is connected to the gate of the FET 160.

The operation of the illustrated apparatus now will be described. When power is first turned on, the capacitor 178 is charged toward the level of the operating voltage +V. As the capacitor 178 is charged, it is appreciated that the voltage applied thereby to the gate electrode of the FET 160 gradually increases. Accordingly, until the FET turn-off voltage level is reached, the charging capacitor 178 renders the FET 160 conductive. Accordingly, a low impedance signal attenuating path is established from the audio signal transmission path through the source-drain channel of the FET to ground. Accordingly, during the initial power turn-on interval, the input signal to the amplifier 168 is substantially attenuated to thereby prevent any undesirable or annoying sound from being generated.

When power is turned off, the capacitor 178, which had been fully charged, now discharges and the gate electrode of the FET 160 is supplied with a potential sufficient to render the FET conductive. Accordingly, the low impedance shunt is connected to the audio signal transmission channel to thereby prevent the generation of loud or annoying noises in the sound transducer connected to the amplifier 168. Thus, it is seen that the capacitor 178 together with the ripple detector 170 serves as a transition detector to sense the positive and negative transitions during the power turn-on and turn-off intervals. These sensed transitions are used to turn the FET 160 on so as to shunt the audio signal transmission path.

During normal operation or the illustrated apparatus, if a ripple voltage greater than a predetermined amount is sensed by the ripple detector 170, a potential is supplied through the resistors 174 and 176 to the transistor 172, thereby rendering this transistor conductive. It is recognized that, when the transistor 172 conducts, current flows from the gate electrode of the FET 160 through the collector-emitter junction of the transistor 172 to ground. Accordingly, the FET 160 is rendered conductive and the aforedescribed low impedance shunt is connected across the audio signal transmission path. Hence, when a substantial ripple voltage in the regulated DC operating voltage is detected, corresponding transients are prevented from being superposed on the audio signal, and undesirably load or annoying noises are prevented from being generated.

The present invention has been particularly shown and described with reference to certain preferred embodiments thereof. However, it will be recognized that various changes and modifications in form and details may be made without departing from the spirit and scope of this invention. For example, the storage element 30 may comprise any suitable storage device, and may comprise a gate-controlled switch, a TRIAC, or other solid state switch. Similarly, the SCR's 24 and 26 can be replaced by other controlled switching devices, such as TRIAC, transistorized switch, or the like. Therefore, it is intended that the following claims be construed as including all such changes and modifications.

What is claimed is:

1. Power supply apparatus for supplying a substantially constant regulated voltage regardless of the variations of an input AC supply voltage, with minimal power dissipation, comprising:

a transformer having a primary winding for receiving said input AC supply voltage and plural secondary windings;

input voltage detecting means for detecting the amplitude of said input AC supply voltage and for producing a control signal as a function thereof;

rectifier means connected to one of said secondary windings for rectifying the voltage produced by said one secondary winding;

switch means connected to the remaining secondary windings for selectively connecting said remaining secondary windings in series with said one secondary winding to correspondingly change the level of said rectified voltage;

switch control means coupled to said switch means and responsive to said control signal for selectively actuating said switch means when the amplitude of said input AC supply voltage crosses a threshold level; and voltage regulating means supplied with said rectified voltage for producing a regulated voltage proportional thereto.

2. Power supply apparatus in accordance with claim 1 wherein said input voltage detecting means includes threshold detecting means for producing said control signal when the amplitude of said AC supply voltage is less than said threshold level.

3. Power supply apparatus in accordance with claim 2 wherein said switch control means comprises actuating means responsive to said input voltage detecting means for actuating said switch means only at predetermined times during the periodic cycle of said input AC supply voltage.

4. Power supply apparatus in accordance with claim 3 wherein said switch means comprises controlled rectifier means coupled to said remaining secondary windings and connected in parallel with said rectifier means.

5. Power supply apparatus in accordance with claim 4 wherein said actuating means comprises zero crossing detecting means for detecting the zero crossing points of said input AC supply voltage; gate means coupled to said input voltage detecting means for supplying an actuating signal when said input AC supply voltage amplitude is detected as being less than said threshold level; enabling means for supplying an enabling signal to said gate means in response to said detected zero crossing points; and energizing means responsive to said actuating signal for energizing said controlled rectifier means.

6. Power supply apparatus in accordance with claim 5 wherein said enabling means comprises pulse producing means responsive to said detected zero crossing points for producing enabling pulses of predetermined duration; and said gate means comprises NOR gate means having one input for receiving said enabling pulses and another input for receiving said control signal, said NOR gate means supplying said actuating signal to said energizing means only during said enabling pulse durations immediately following a zero crossing point.

7. Apparatus for producing an output voltage within a confined range regardless of the range of variation of an input voltage, comprising:

transformer means having a primary winding for receiving an input voltage and a secondary winding for producing an output voltage, said secondary winding being formed of at least first and second sets of windings;

switch means for selectively connecting said first and second sets of windings in series-aiding relationship to thereby increase the ratio of transformation between said primary and secondary windings;

voltage sensing means for sensing when said input voltage is less than a predetermined magnitude and to produce an actuating signal, and for sensing when said input voltage is greater than said predetermined magnitude;

actuating means responsive to said actuating signal for actuating said switch means to connect said first and second sets of windings; and supply means for supplying said actuating signal to said actuating means only at predetermined times.

8. Apparatus in accordance with claim 7 wherein said supply means comprises zero crossing detect means for detecting the zero crossing points of said input voltage; pulse producing means responsive to said zero crossing detect means for producing pulses of predetermined duration; and gating means for supplying said actuating signal to said actuating means during a portion of each said pulse duration.

* * * * *